No. 611,616. Patented Oct. 4, 1898.
J. EMRINGER & P. E. MARCHAND.
APPARATUS FOR MAKING AERATED WATERS OR BEVERAGES.
(Application filed Dec. 29, 1897.)
(No Model.)
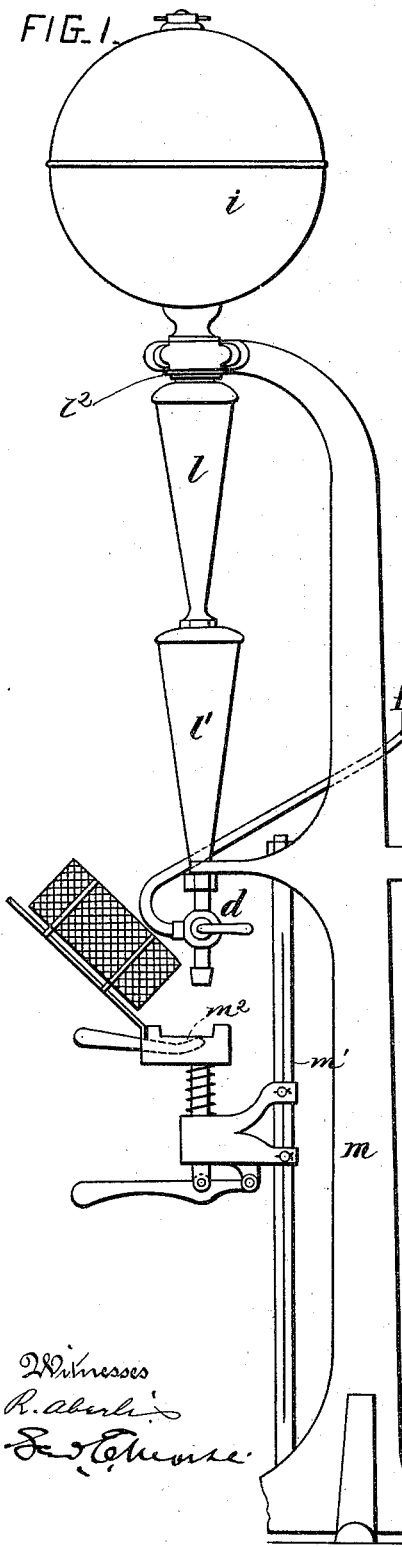
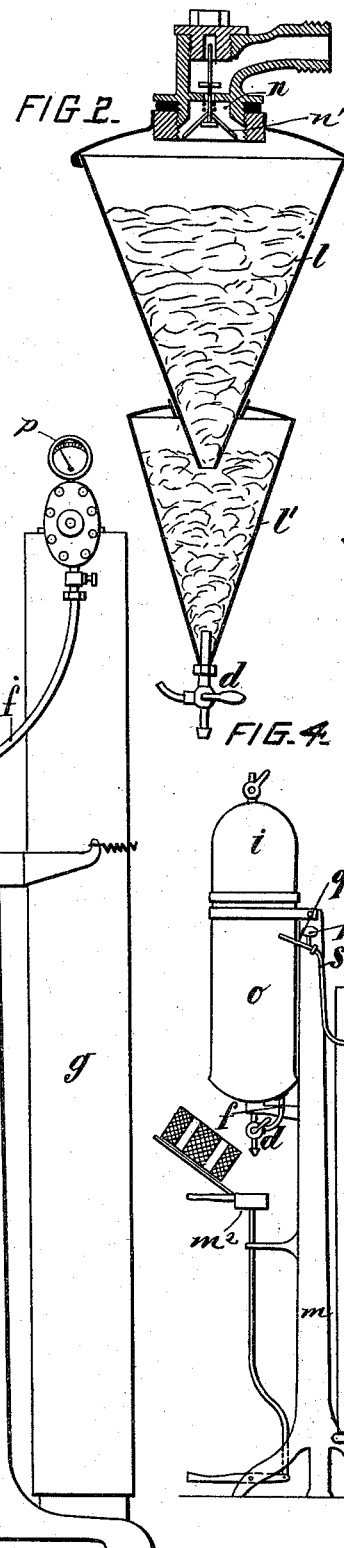
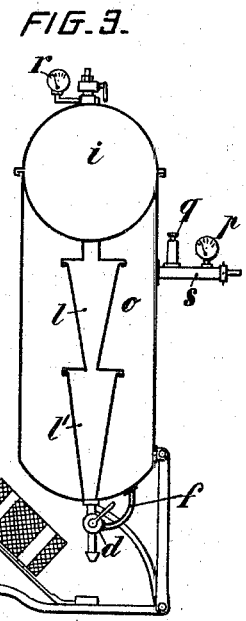
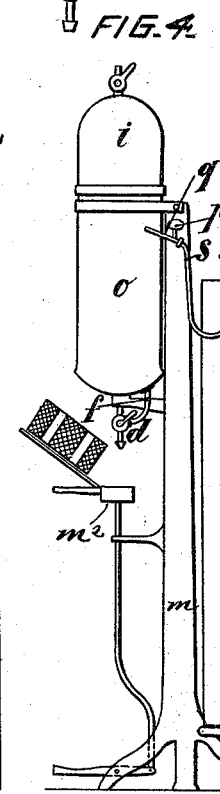
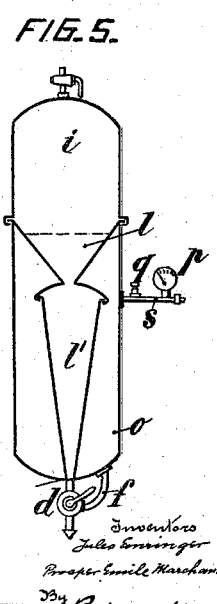

UNITED STATES PATENT OFFICE.

JULES EMRINGER AND PROSPER EMILE MARCHAND, OF PARIS, FRANCE.

APPARATUS FOR MAKING AERATED WATERS OR BEVERAGES.

SPECIFICATION forming part of Letters Patent No. 611,616, dated October 4, 1898.

Application filed December 29, 1897. Serial No. 664,393. (No model.) Patented in France March 24, 1897, No. 265,347; in Belgium September 13, 1897, No. 130,626, and in Canada November 22, 1897, No. 58,190.

*To all whom it may concern:*

Be it known that we, JULES EMRINGER and PROSPER EMILE MARCHAND, of the city of Paris, France, have invented an Improved Apparatus for Making Aerated Waters and Beverages, (for which we have obtained Letters Patent in France for fifteen years, dated March 24, 1897, No. 265,347; in Belgium for twenty years, dated September 13, 1897, No. 130,626, and in Canada for eighteen years, dated November 22, 1897, No. 58,190,) of which the following is a full, clear, and exact description.

This invention relates to apparatus for making aerated waters and beverages, and has for its object to effect an instant and thorough saturation and to facilitate the working of the apparatus.

The improvements relate especially to the vessel receiving the saturating material, its combination with the water-receiver, the carbonic-acid receiver, and a two-way cock for the intermittent supply of the liquid and the gas.

Reference is to be had to the accompanying drawings, in which—

Figure 1 is an elevation of an apparatus embodying our invention. Fig. 2 is an enlarged sectional view of the saturation-chamber thereof, showing the same connected to a source of water-supply under pressure. Fig. 3 is a sectional elevation of another form of apparatus embodying our invention, wherein the gas-holder surrounds the saturation-chamber. Fig. 4 is an elevation of still another apparatus embodying our invention; and Fig. 5 is an enlarged section through the water-receiving, gas-holding, and saturation chambers.

In the figures similar letters of reference indicate similar parts.

In the drawings, $m$ is a stand employed to support the apparatus. This stand supports a water-receptacle $i$, which communicates with the upper conical chamber $l$ by a pipe $l^2$. The upper cone communicates with the lower conical chamber $l'$. These two conical chambers are filled with saturating material—such as wood fiber, sponge, tin-scrap, cotton, &c.—and constitute the saturation-chamber. The apex of the upper conical chamber preferably extends into the base of the lower conical chamber, as shown in Fig. 2. The apex of the lower conical chamber $l'$ communicates with a two-way cock $d$. This two-way cock $d$ receives gas from a tube $f$, which communicates with a gas-holder $g$, provided with a pressure-gage $p$. The bottle to be charged may be carried upon a holder $m^2$, supported by a rod $m'$, forming part of the stand $m$ and operated by hand or foot power. The upper end or base of the conical chamber $l$ may be provided with a guided check-valve $n'$, (see Fig. 2,) which at the proper time receives pressure to close the inlet-pipe $n$, shown in this instance as adapted to be connected to a source of water-supply of constant pressure.

In the modification shown in Fig. 3 the apparatus is surrounded by a cylinder $o$, forming a holder for the gas required for saturation without the use of any regulating device. A pressure-gage $p$ is provided to indicate the pressure and safety-valve $q$ to regulate the pressure in cylinder $o$, while another gage $r$ indicates the pressure of saturation at the point of injection. The gas-holder $o$ enables a pressure-reducer to be dispensed with. The gas-holder is connected to the carbonic-acid receiver by a tube $s$, and the gas is conveyed to the cock $d$ by the tube $f$.

In Fig. 5 the water-receiver is a cylinder or dome-shaped chamber $i$, whose edges make a joint with the cone $l$.

The apparatus may either be fixed to the wall or mounted on a frame. Fig. 4 shows the apparatus constructed as in Figs. 3 and 5 fixed to a frame. The form and arrangement of the cones containing the saturating material enables the apparatus to be made of less height than heretofore.

To obtain an instantaneous and complete saturation with either form of apparatus, the operation is as follows: The apparatus being full of water, the cock $d$ is turned so as to allow the gas to enter the saturation-chamber without letting the water escape. The saturating material becomes impregnated with this gas, of which a portion collects at the upper part of the cones $l\,l'$ and the receiver $i$. The receptacle (siphon, bottle, &c.) being applied beneath the cock $d$, the latter is turned back, so as to cut off the supply of the gas and permit the flow of the water. At this moment there is no longer any pressure at the lower part of the apparatus. The gas at the upper part and in the saturating material tends to escape by the cock $d$, drives out the water, passes through it, and flows along with it into the receptacle, where the gas and water thus forcibly projected combine. There are thus, in effect, three saturations—the first on the admission of the gas, the second on the drawing off of the water, and the third in the receptacle (bottle or siphon) itself.

What we claim, and desire to secure by Letters Patent, is—

1. In an apparatus for aerating liquids, the combination of a liquid-saturating chamber and a liquid-supply, the said saturating-chamber being composed of a plurality of conical chambers, one of the said conical chambers communicating with the other conical chamber at one end, and with the liquid-supply, and the other of the said conical chambers communicating with a two-way valve or cock provided with a gas-supply conduit, whereby by manipulating the cock a supply of gas may be admitted into the saturating-chamber and by further manipulating the cock the said gas-supply may be shut off and the water or the liquid in the saturating-chamber allowed to rush out under the influence of the gaseous pressure in the said chamber.

2. The herein-described apparatus for aerating liquids, the same comprising a liquid-supply, a saturation-chamber comprising a plurality of cones, the base of one cone communicating with the liquid-supply, and its apex communicating with the base of the other cone, and the base of the second cone communicating with a two-way valve provided with a gas-supply conduit, whereby upon manipulating the valve gas may be admitted to the saturation-chamber and upon further manipulating the said valve the charged liquid may be ejected from the said saturation-chamber through the valve by the gaseous pressure existing in the said chamber.

3. An aerating apparatus for liquids, comprising a liquid-supply means, a saturation-chamber comprising a plurality of cones communicating with each other, a check-valve intervening between one cone and the liquid-supply means, the other of the said cones communicating with the two-way cock or valve provided with a gas-supply, whereby by manipulating the valve or cock a supply of gas may be admitted to the saturation-chamber and upon further manipulating the said valve or cock the gas-supply may be shut off and the charged liquid be allowed to escape from the saturation-chamber through the valve or cock, substantially as described.

Signed by us this 10th day of December, 1897.

JULES EMRINGER.
PROSPER EMILE MARCHAND.

Witnesses:
EDWARD P. MACLEAN,
MAURICE HENRI PIGNET.